Jan. 11, 1966   D. A. PANNELL   3,229,136

DYNAMO-ELECTRIC MACHINES

Filed June 6, 1962

United States Patent Office 3,229,136
Patented Jan. 11, 1966

3,229,136
DYNAMO-ELECTRIC MACHINES
Dennis Alexander Pannell, Acton, London, England,
assignor to Rotax Limited, London, England
Filed June 6, 1962, Ser. No. 200,504
Claims priority, application Great Britain, June 12, 1961,
21,090/61
2 Claims. (Cl. 310—265)

This invention relates to dynamo-electric machines of the kind including a rotor comprising a cylindrical field tube having in its periphery angularly spaced apertures, a spider formed from magnetic material located within the tube with its pole heads situated respectively within the apertures but spaced from the edges thereof, the outer surfaces of the pole heads being of part cylindrical form struck from the axis of the tube, and coaxially disposed field windings within the tube for magnetising the spider.

The object of the invention is to provide an improved construction of such a rotor.

According to the invention in a rotor for a dynamo-electric machine of the kind specified the spider has an odd number of equiangularly spaced legs and the tube is held in position by means of screws passing therethrough at points diametrically opposite the legs.

Figure 1:
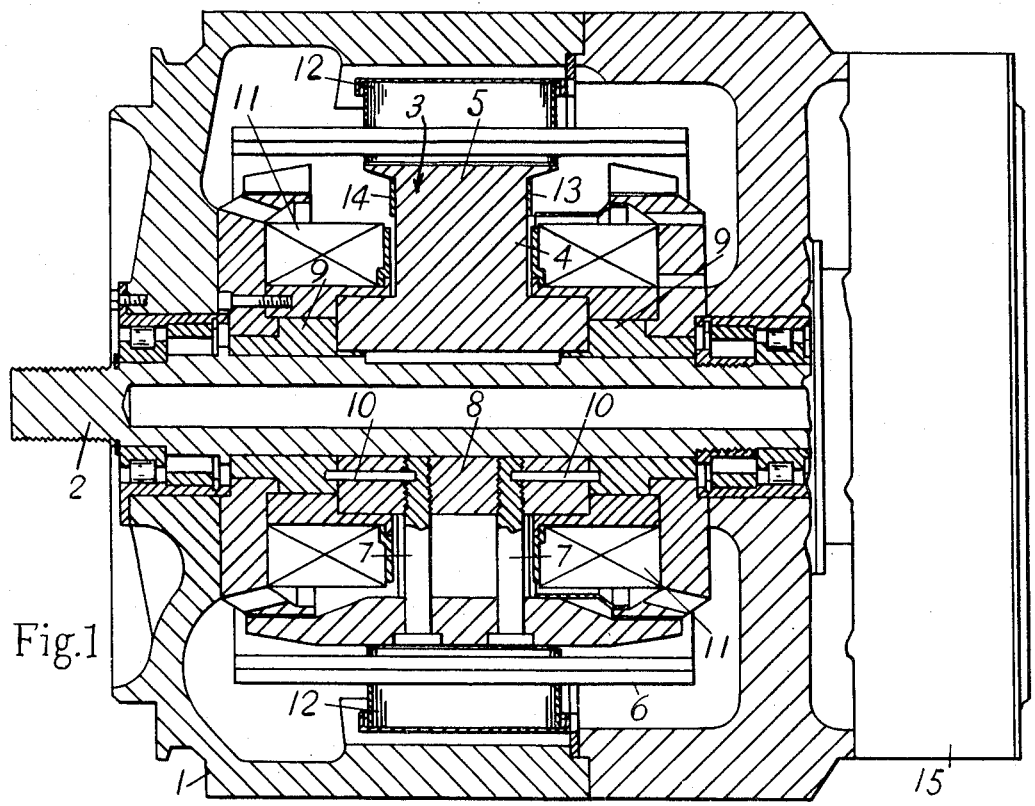
Figure 2:
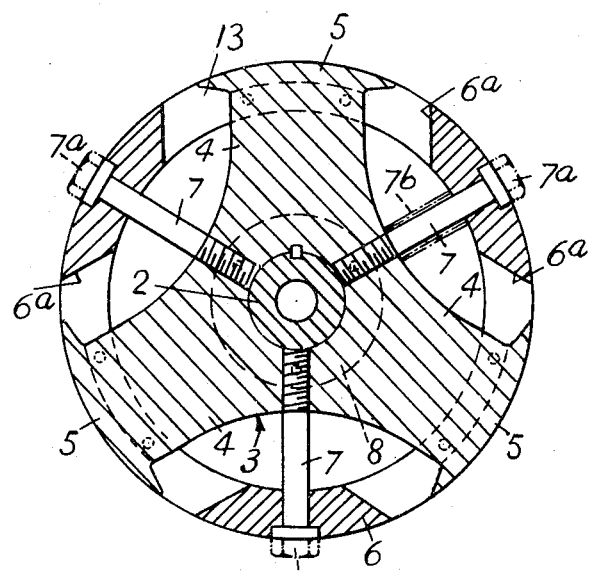

In the accompanying drawings:

FIGURE 1 is a sectional side view of a dynamo electric machine in accordance with the invention and FIGURE 2 is a sectional end view of the rotor of the dynamo electric machine shown in FIGURE 1.

Referring to the drawings which illustrate an alternator constructed according to the invention there is provided a casing 1 in which is journalled a central hollow and non-magnetic shaft 2 which at one end is splined or otherwise adapted for connection to an engine (not shown) by which it can be driven. Keyed to the shaft is a spider 3 formed from magnetic material, and having three equiangularly spaced legs 4. The outer ends of the legs are enlarged to constitute pole heads 5 which are located respectively within three equi-angularly spaced apertures formed in a cylindrical field tube 6 concentrically surrounding the shaft, and held in position by three pairs of screw-threaded bolts 7 passing through the tube respectively at points diametrically opposite the apertures 6ª into a central boss 8 of the spider. The outer surface of the pole heads 5 of the spider form parts of a common cylindrical surface of a diameter equal to the diameter of the tube and struck from the axis of the shaft. Moreover, the bolts 7 are adjusted until the tube 6 is concentric with the shaft 2, in which position the pole heads 5 are spaced from the edges of the apertures 6ª by air gaps. After the bolts 7 have been adjusted the hexagonal portion of the head 7ª of the bolt is machined away so that the bolt head is flush with the tube.

If desired, the bolts 7 may be surrounded by spacing sleeves positioned between the spider 3 and the tube 6, one such sleeve being indicated in dotted lines at 7ᵇ in FIGURE 2. The sleeves surrounding each pair of parallel bolts 7 may be constituted by a pair of bores in a single member, which may also be formed with further bores to reduce its weight.

Closely surrounding the shaft 2 at opposite sides of the boss 8 of the spider 3 respectively are a pair of bushes 9 formed from magnetic material. These bushes are prevented from angular movement relative to the spider by means of dowel pins 10 which also pass through the boss into the bolts to lock the latter in position after assembly.

The pair of bushes 9 and the adjacent parts of the spider boss 8 respectively are surrounded by a pair of relatively fixed field windings 11 which are carried by parts secured to the casing 1. Also secured to the casing, at a position in register with the apertures in the tube, is a stack of annular stator laminations 12 having slots in which the stator windings (not shown) are accommodated.

In use the field windings are supplied with rectified A.C. from the output of the alternator. However, for supplying current to the field windings when starting, a small subsidiary A.C. generator 15 is attached to one end of the casing, the rotor of this generator being mounted on the end of the shaft remote from that which is adapted for connection to the driving source.

When the rotor is rotating cooling air is drawn axially through the machine towards the subsidiary A.C. generator 15. However, there is a tendency for this cooling air to be directed radially by the spider 3, and to be discharged through the gaps between the edges of the apertures 6ª and the pole heads 5 at the downstream side of the latter. In order to minimise this leakage, arcuate non-magnetic baffle plates 13 are connected to the downstream sides of the legs 4 beneath the heads to extend across the gaps in a circumferential direction, the weight of these plates being balanced by smaller plates 14 of greater specific gravity secured to the upstream sides of the legs 4 to maintain the substantial dynamic balance of the rotor. An annular shroud 16 is fixed around the field coil 11 to direct air over the coil from the baffle plates 13.

Having thus described my invention, what I claim as new and desire to secure by Letters Patent is:

1. A rotor for an alternating current generator comprising a cylindrical field tube, a plurality of angularly spaced apertures formed in the periphery of the field tube, a spider formed from magnetic material within the field tube, said spider having a plurality of equi-angularly spaced radial legs which terminate in pole heads respectively having their outer surface of part cylindrical form struck from the axis of the field tube, said pole heads being situated within the apertures respectively but spaced from the edges thereof, and at least three circumerentially spaced screws passing through the field tube and engaging with said spider at points intermediate a pair of adjacent legs respectively, said screws serving to center and secure said tube to said spider.

2. A rotor for an alternating current generator comprising a cylindrical field tube, a plurality of angularly spaced apertures formed in the periphery of the field tube, a spider formed from magnetic material within the field tube, said spider having a plurality of equi-angularly spaced radial legs which terminate in pole heads respectively having their outer surfaces of part cylindrical form struck from the axis of the field tube, said pole heads being situated within the apertures respectively but spaced from the edges thereof, at least three circumferentially spaced screws passing through the field tube and engaging with the spider at points intermediate a pair of adjacent legs respectively, said screws serving to center and secure said tube to said spider, and a plurality of dowel pins extending through the spider and engaging with the screws respectively for preventing rotation of the latter.

References Cited by the Examiner
UNITED STATES PATENTS

| | | | |
|---|---|---|---|
| 729,655 | 6/1903 | Parsons | 310—261 |
| 2,223,866 | 12/1940 | Beechlyn | 310—106 |
| 2,683,230 | 7/1954 | Mickelson | 310—163 |
| 2,733,362 | 1/1956 | Bauer et al. | 310—162 |
| 2,796,542 | 6/1957 | Bekey et al. | 310—162 |

ORIS L. RADER, Primary Examiner.

MILTON O. HIRSHFIELD, Examiner.